Dec. 27, 1960

R. H. WALKER, JR 2,966,309

BOLTLESS RAIL JOINT

Filed May 1, 1958

INVENTOR
R. H. WALKER, JR.
BY
ATTORNEY

Dec. 27, 1960 R. H. WALKER, JR 2,966,309
BOLTLESS RAIL JOINT
Filed May 1, 1958 3 Sheets-Sheet 2
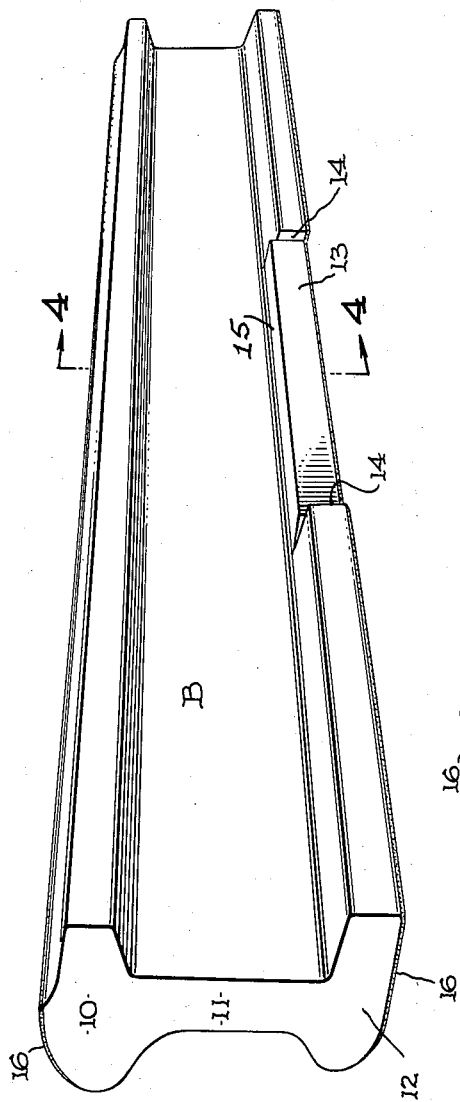
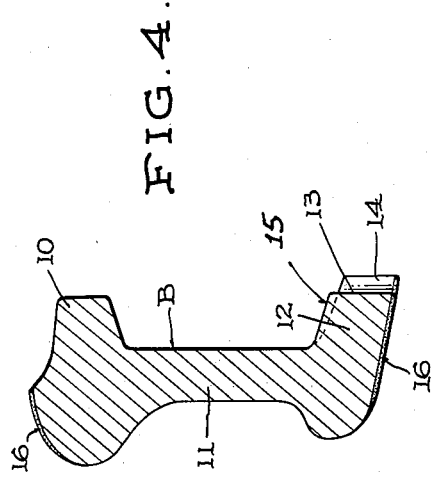
INVENTOR
R. H. WALKER, JR.
BY
ATTORNEY Dec. 27, 1960   R. H. WALKER, JR   2,966,309
BOLTLESS RAIL JOINT
Filed May 1, 1958   3 Sheets-Sheet 3
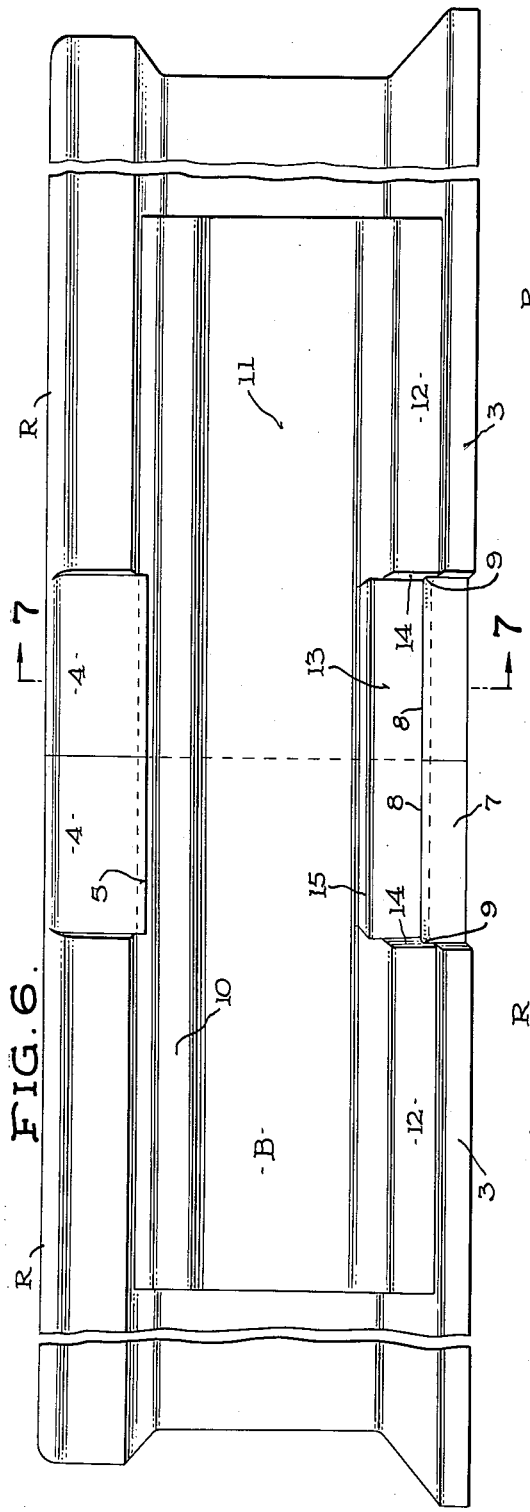
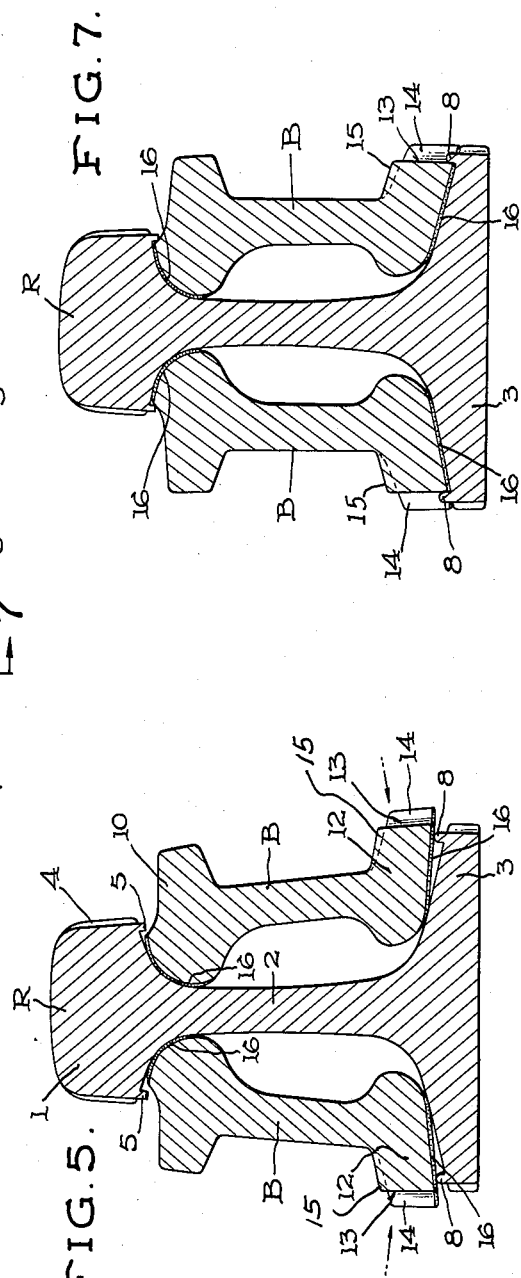
INVENTOR
R. H. WALKER, JR.
BY
ATTORNEY

United States Patent Office 2,966,309
Patented Dec. 27, 1960

2,966,309

BOLTLESS RAIL JOINT

Robert H. Walker, Jr., Oradell, N.J., assignor to Poor & Company, Chicago, Ill., a corporation of Delaware Filed May 1, 1958, Ser. No. 732,294

1 Claim. (Cl. 238—254)

This invention relates to an improvement in boltless rail joints for use with hole-less rail.

Heretofore, it has been the general practice to bolt joint bars to the rail and to leave a gap between the rail ends to enable the same to move in the joint to a slight degree to take care of expansion and contraction due to differential seasonal temperatures.

The increasing cost of labor in the maintenance of bolted joints led to welding standard thirty-nine foot rail lengths together to reduce the number of bolted joints. This step was taken in the hope of reducing maintenance costs notwithstanding the fact that it was necessary to use some bolted joints to connect sizeable lengths of the so-called continuous rail sections into track formation. The theory involved under this procedure was that the cumulative contraction and expansion of the greater continuous rail length could be reduced by anchoring the rails to both sides of each tie. The chief objection to long length of welded rail, aside from its high initial costs, is that if a rail breaks the broken sections must be cut out with a saw or torch, the webs drilled for bolt holes and a bolted joint replacement made. This is time consuming and expensive.

In another effort to reduce the maintenance cost of bolted joints, it was proposed to freeze the rail ends in the joint as proposed many years ago in Patent No. 1,857,952. The proposal of this patent, however, proved impractical in use because of the stress raisers set up in the metal of the rail and the bars. On the other hand, frozen joints have been thoroughly tested with satisfactory results as shown in the patent, No. 2,785,862.

In the last decade, great advances have been made in glues and adhesives for securing metal parts together. This practice is simple and relatively inexpensive as compared with electric welding. One deterrent to the use of glued bolted rail joints is that when the bars are subjected to high pressures due to tightening of the bolts, glue is squeezed out from the contacting faces of the bars and rail ends which reduces the effective depth of the final glue line. It can thus be seen that a problem is created in gluing rail joints to rails which is not encountered in connecting metal parts which are not forced together under great pressure. One solution to this problem in a bolted glued rail joint is disclosed in the construction of co-pending application Serial No. 650,496, Gadd.

Accordingly, a primary object of the present invention is to solve the problems heretofore outlined by providing a boltless glued rail joint wherein the rail ends and bars are slightly modified in a practical manner without impairing strength thereof to provide a snap-in mechanical interlock therebetween to avoid excessive squeezing out of the glue thereand to also hold the joint bars against outward and longitudinal shifting.

Another object of the invention is to provide a construction which lends itself to conventional rolling mill and die pressing operations to cause a minimum of disturbance in the fibers of the metal, thereby removing the cause for incipient tracks which might eventually lead to possible breakage under heavy wheel loads.

With the above and other objects in view which will appear as the nature of the invention is better understood, the invention consists in the novel construction, combination, and arrangement of parts, hereinafter more fully described, illustrated and claimed.

A preferred and practical embodiment of the invention is shown in the accompanying drawings, in which:

Figure 3 is a perspective view of a joint bar embodying the present improvements and for use in connection with the rail of Figures 1 and 2.

Figure 4 is a vertical sectional view taken on the line 4—4 of Figure 3.

Figure 5 is a vertical cross-sectional view illustrating the position of the joint bars prior to being forced to final position for connecting the rail ends.

Figure 6 is a side elevation of a rail joint and rail ends with the bars in final seating position in relation to the rail.

Figure 7 is a vertical cross-sectional view taken on the line 7—7 of Figure 6.

Similar reference characters designate corresponding parts throughout the several figures of the drawings.

Figures 1, 2:
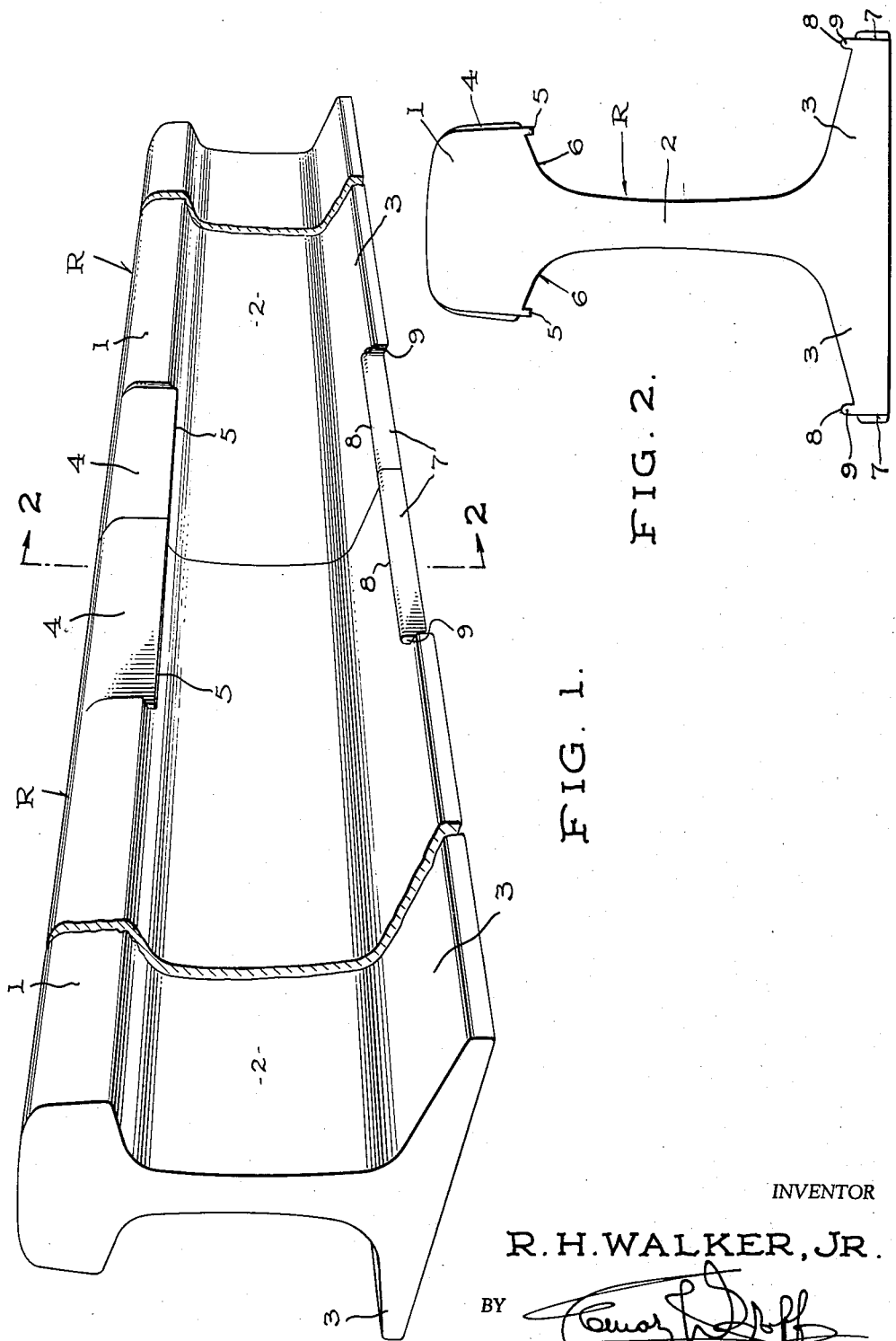
Figure 1 is a perspective view of abutting rail ends illustrating the present improvements.
Figure 2 is a vertical cross-sectional view on the line 2—2 of Figure 1.

Referring first to Figure 1, it will be seen that the rail ends R, R have their vertical end faces in abutting relation. The rails include a head portion 1, a web 2, without bolt holes, and base flanges 3.

The head of each rail inwardly of the end face thereof is deformed by pressing both the gauge side and the field side of the head inwardly and downwardly to provide communicating depressed portions 4, 4 at said gauge and field sides of the rail while the outer edges of the downwardly pressed metal form locking beads or lips 5,5. Thus, it will be understood that the metal in the head of the rail is pressed inwardly and downwardly to provide the ribs 5 and which substantially define socket portions 6 for receiving the head of the related bar.

Referring to the base flanges 3, it will be seen that the meeting edge portions of said flanges are subjected to a pressing operation which moves the metal thereof inwardly to form the partial recesses 7 and upwardly to provide the bead sections 8 lying below the rib 5. The outer ends of the bead sections 8 provide shoulders 9 when the partial recesses and beads are aligned as shown in Fig. 1.

The joint bars, as will be seen from Figure 3, include a head portion 10, a web 11, also without bolt holes and a foot portion 12. This foot portion is medially pushed inwardly and upwardly as shown in both Figures 3 and 4 to provide a single recess whose long wall 13 constitutes a clearance for receiving the aligned sections of the lower ribs 8 of the rail ends while the end walls of the recess provide shoulders 14 which straddle or embrace the aligned ribs 8 on the aligned rail bases. Also the portion of the foot of the bar pushed upwardly and inwardly results in an upwardly offset portion 15.

As shown in Figures 3–7 inclusive, the joint bars B have their respective upper and lower rail contacting surfaces supplied with a suitable glue or adhesive 16.

The mode of assembling the joint bars B in relation to the ends of the rails R is illustrated in Figures 5, 6 and 7.

Referring first to Figure 5, it will be seen that the joint bars B have their load bearing head portions, which engage in the fillets at the underside of the rail head, initially disposed within the sockets 6 at the underside of the rail head while the foot portions 12 of the bars rest on the upper edge portion of the aligned bead sections 8 on the base flanges of the rail.

With the bars B in the inclined or cocked relation shown in Figure 5, suitable force is applied to the joint bars to rock them into position shown in Figures 6 and 7. This force may be applied by a track implement or a pneumatic press, but in either event the heads of the bars including the adhesive 16 becomes fast with the load bearing surfaces at the underside of the rail head and also becomes locked behind the upper beads 5 at the underside of the rail head. Likewise the foot portions 12 of the bar have the long bottom walls of the recesses 13 snap behind the rear edge of the aligned locking bead sections 8 on the base flanges 3 to be held against lateral or outward movement. In addition, the shoulders 9 at the outer ends of the aligned locking bead sections 8 engage with the abutment shoulders 14, 14 of each of the recesses 13 to resist longitudial movement.

It will now be clear that the joint bars are applied to the rail ends by rocking the joint bars from the position shown in Figure 5 to the position of Figure 7, and in which position, recesses 7 and 13 register (Fig. 6) and the joint bars are locked against lateral and longitudinal displacement due to the ends of ribs 8 engaging abutment walls 14 of recess 13, while, at the same time, the glue or adhesive 16 between the load bearing surfaces of the bars and the rails will augment the holding power of the bars in relation to the rail ends so that a frozen boltless joint is provided.

It will be understood that the adhesive or glue used to further lock the bars and rails together may be of any suitable composition, such for example as those of the epoxy resin type or other compositions suitable for the purpose.

I claim:

A boltless rail joint, comprising in combination, a pair of rail ends each including heads, and base flanges connected by webs, aligned bead sections depending from the adjacent lateral edges of the rail head and complementary partial recesses formed in the base flanges of each adjacent rail and together forming a continuous recess opening at the edge of the base flange, complementary upstanding bead sections at the inner edge of each partial recess and when the rail ends are aligned to form said continuous recess the beads are also aligned to provide a continuous bead with an inwardly facing abutment edge, shoulders at the outer ends of the beads and exposed above the face of base flanges and joint bars in the fishing space of the rail ends and bridging the meeting ends thereof, said bars having heads and foot portions connected by a web, said heads fitted behind the depending beads on the rail heads, and said foot portions each having a medial recess also opening at the edge of the said foot portions and whose ends embrace the shoulders at the ends of the beads when the recesses register with recesses to lock the bars against longitudinal movement and the inner edge of said recesses engage behind the inner edges of the aligned complementary bead sections to lock the foot portions of the bars against outward movement.

References Cited in the file of this patent

UNITED STATES PATENTS

| | | |
|---|---|---|
| 174,248 | Hughes | Feb. 29, 1876 |
| 464,699 | Edmondson | Dec. 8, 1891 |
| 791,804 | Mellinger | June 6, 1905 |
| 946,698 | Johnson | Jan. 18, 1910 |
| 1,844,512 | Mains | Feb. 9, 1932 |
| 2,499,134 | De Bruyne | Feb. 28, 1950 |

FOREIGN PATENTS

| | | |
|---|---|---|
| 55,290 | Austria | Sept. 10, 1912 |